United States Patent [19]
Daly et al.

[11] Patent Number: 5,274,738
[45] Date of Patent: Dec. 28, 1993

[54] MODULAR DIGITAL VOICE PROCESSING SYSTEM

[75] Inventors: Daniel F. Daly, Monroe; John J. Dwyer, Stratford; Mark N. Harris, New Haven; Salvatore J. Morlando, Easton; Thomas C. Grandy, Huntington; Mark Sekas, Orange; Shamla V. Sharma; Jy-Hong Su, both of Norwalk, all of Conn.

[73] Assignee: Dictaphone Corporation, Stratford, Conn.

[21] Appl. No.: 815,202

[22] Filed: Dec. 31, 1991

[51] Int. Cl.⁵ .............................................. G10L 9/00
[52] U.S. Cl. .............................................. 395/2
[58] Field of Search ........................ 381/41-53; 395/2, 275; 379/372, 88, 89, 90, 67; 375/46

[56] References Cited

U.S. PATENT DOCUMENTS

| | | | |
|---|---|---|---|
| 4,785,408 | 11/1988 | Britton et al. | 395/2 |
| 4,799,144 | 1/1989 | Parruck et al. | 379/284 |
| 4,959,855 | 9/1990 | Daudelin | 379/213 |
| 4,975,941 | 12/1990 | Morganstein et al. | 379/213 |
| 4,991,217 | 2/1991 | Garrett et al. | 381/43 |

*Primary Examiner*—Michael R. Fleming
*Assistant Examiner*—Michelle Doerrler
*Attorney, Agent, or Firm*—Peter Vrahotes; Melvin J. Scolnick

[57] ABSTRACT

A digital voice processing system wherein voice processing functions are run in software. This application of software allows a modular structure because the application software resides in boards that are coupled to a host computer. With this structure, the software can be updated as required and the capacity of the system can be readily expanded to meet increased needs.

10 Claims, 2 Drawing Sheets

1

MODULAR DIGITAL VOICE PROCESSING SYSTEM

BACKGROUND OF THE INVENTION

Digital voice processing systems are known that communicate with telephone systems to perform functions such as voice signal compression, storage and retrieval, automatic gain control, voice activated operation, telephone functions and the like. These functions are performed by such systems in hardware which was costly and inflexible. In addition, expansion of a prior voice processing system was difficult because of the need for additional hardware, not only because of the expense associated therewith, but also because of the geography factor, i.e., a larger footprint was required.

With the ever increasing change in technology, particularly software, it would be advantageous to be able to provide a software based digital voice processing system that is capable of being quickly, conveniently and inexpensively expanded. In addition, it would be advantageous to provide a digital voice processing system which is capable of handling a large amount of data and which is capable of being quickly conveniently and inexpensively expanded as required.

SUMMARY OF THE INVENTION

A modular digital voice processing system has been conceived and developed wherein voice processing functions are run in software. This allows a modular structure whereby units can be readily added or removed. The application software resides in circuit boards that are coupled to a host computer so that the software can be changed as applications require and the number of boards can be increased readily for greater capacity. The host computer is in communication with one or more voice processing circuit boards that perform digital voice processing, and telephone signal processing and application processing. The voice processing circuit boards are in communication with one or more audio circuit boards that digitize data received from outside devices. The voice processing circuit boards communicate with the audio circuit boards through a time division multiplexer bus (TDM). Each audio circuit board includes an analogue unit at receives analogue signals from direct connect and loop start telephones, PBX's and the like, converts the analogue signals to digital and sends the digital data to a signal processor that is used as a high speed multiplexer. The signal processor then sends the signals through a TDM chip onto the TDM bus and they are subsequently received by the voice processing circuit board. The voice processing circuit board performs signal compression, automatic gain control, voice activated operation and application processing. Subsequent to the processing taking place in the voice processing board, data is forwarded from the voice processing, circuit board to the host computer for further processing and storage.

DETAILED DESCRIPTION OF THE PREFERRED EMBODIMENT(S)

Figure 1:
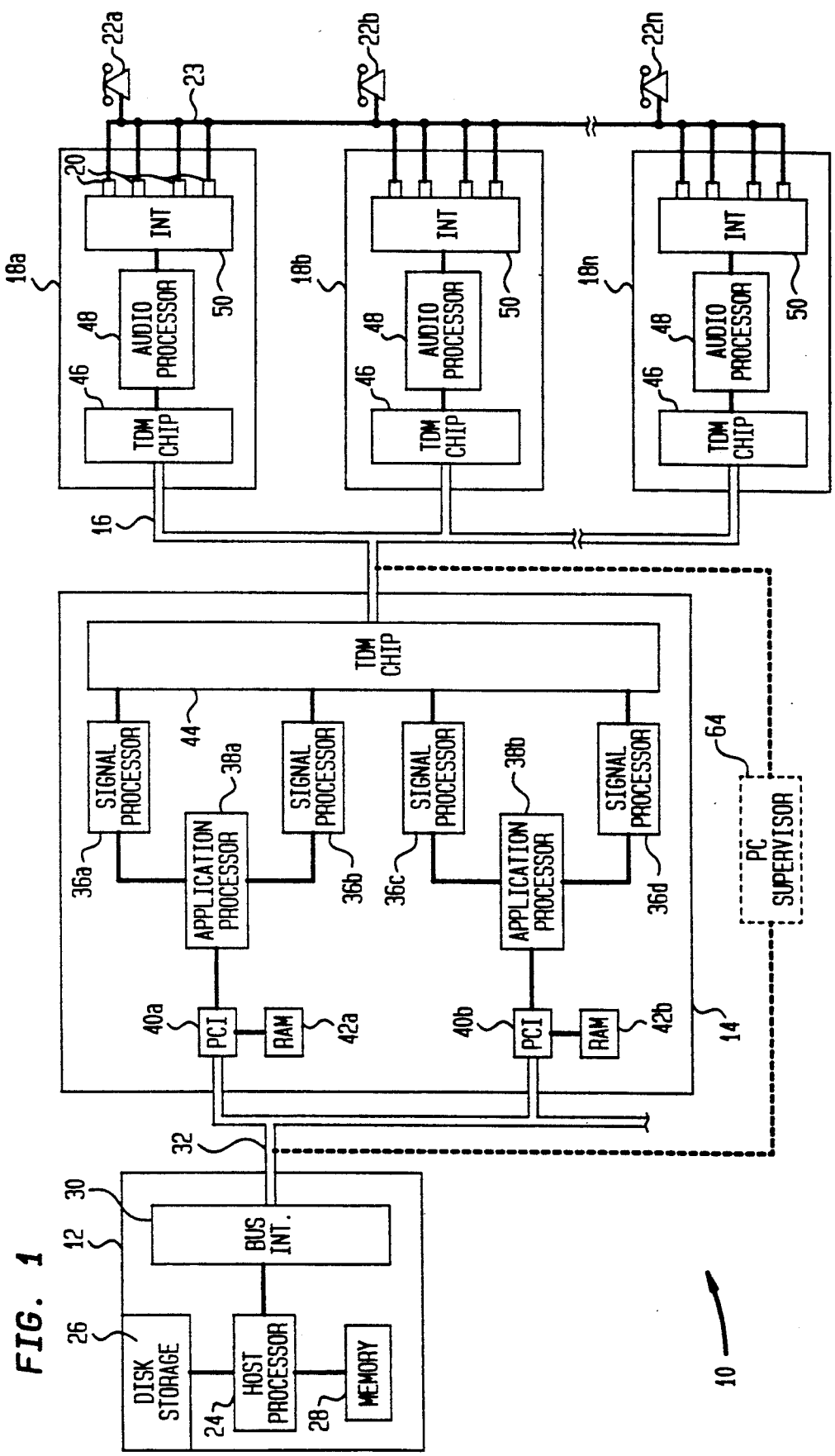
FIG. 1 is a block diagram of a system in which the instant invention can be practiced.

With reference to FIG. 1, a digital voice processing system is shown general at 10 that has a host computer 12, a voice processing circuit board, referred to hereinafter as voice processing card 14, and a time division multiplexer (TDM) bus 16 that connects the voice processing card to a plurality of audio circuit boards 18a, 18b . . . 18n, each of which hereinafter will be referred to as an audio card. Each audio card 18a, 18b . . . 18n has four ports 20 through which communication can be had with a plurality of devices such as direct connect and loop start telephones 22a, 22b . . . 22n, PBX's and the like through telephone lines 23. The telephones can be used to issue commands to the system 10 through DTMF tones. One of the features of the system 10 is that it can act as a telephone switch system.

The host computer 12 can be any of a number of commercially available computers such as an IEEE 996 Standard PC/AT which includes a processor 24, which is in communication with a disk storage 26 and a memory 28. The processor 24 is also in communication with a bus interface 30. The disk storage 26 acts as a storage medium for storing prompts, operating data base directory information and other data. It also serves as back-up memory when the capacity of the memories in the voice processing card 14 are exceeded. Prompts are recorded messages, instructions and menus that are for the purpose of assisting a caller in the use of the voice processing system 10. The memory 28 is a volatile memory which receives the overating code for the system 10 from the disk storage 26 on start-up. The memory 28 also stores diagnostic information and serves as a buffer. The bus interface 30 provides communication between the processor 24 and the voice processing card 14 through a bus 32.

The voice processing card 14 has essentially two independent circuits therein which will be described simultaneously. The voice processing card 14 is shown and described in greater detail in concurrently filed patent application having Ser. No. 07/815,207 and entitled Digital Signal Processing Circuit Board which is hereby incorporated by reference. Each circuit has a host computer interface (PCI) chip 40a, 40b to which a RAM 42a, 42b, respectively, is connected for temporary storage of data and storage of the operating code received from the host computer 12 during initialization. Details of the PCI chip 40a, 40b are given in concurrently filed patent application Ser. No. 07/816,516 and entitled Interface Chip for a Voice Processing System, which is hereby incorporated by reference. Each interface 40a, 40b is in communication with an application processor 38a, 38b, respectively, such as an Intel SOC186. The application processors 38a, 38b run the application processing and database management. Each application processor 38a, 38b is in communication with and controls a pair of signal processors 36a and 36b and 36c and 36d, respectively, which may be a TMS 320C25 processor from Texas Instruments.

All the signal processors 36a–36d are in communication with a time division multiplexer (TDM) chip 44 which is in communication with the bus 16. Details of the TDM chip are shown and described in concurrently filed patent application having Ser. No. 07/441,491 and entitled Time Division Multiplexer Chip and Process Thereof which is hereby incorporated by reference. The signal processors 36a–36d perform voice compression and expansion, depending upon the direction of the data stream, tone detection, voice activated operation, VOX, voice operated recording, automatic gain control, control information decoding and telephone call processing.

Each audio card 18 is in communication with the TDM chip 44 through the bus 16 and includes a time division multiplexer (TDM) chip 46 which is identical to the TDM chip 44 of the voice processor card 14 except that it has fewer components connected since it only communicates with one audio processor 48. Details of the audio card 18 can be found in concurrently filed patent application Ser. No. 07/815,205 and entitled Audio Circuit Board for a Modular Digital Voice Processing System, which is hereby incorporated by reference. The TDM chip 46 is in communication with a high speed, processor 48 such as a TMS 320C10 available from Texas Instruments, the latter being in communication with an analogue interface 50 which interfaces through ports 20 with telephones 22a, 22b ... 22n, through telephone lines 23. The analogue interface 50 can also communicate through the ports 20 with public switch networks, private branch exchanges (PBX) and the like. Optionally, a PC supervisor 64 can be attached to the host computer 12 through an RS232 link for the purpose of providing a keyboard and a screen through which a supervisor can supervise or monitor the system 10.

Figure 2:
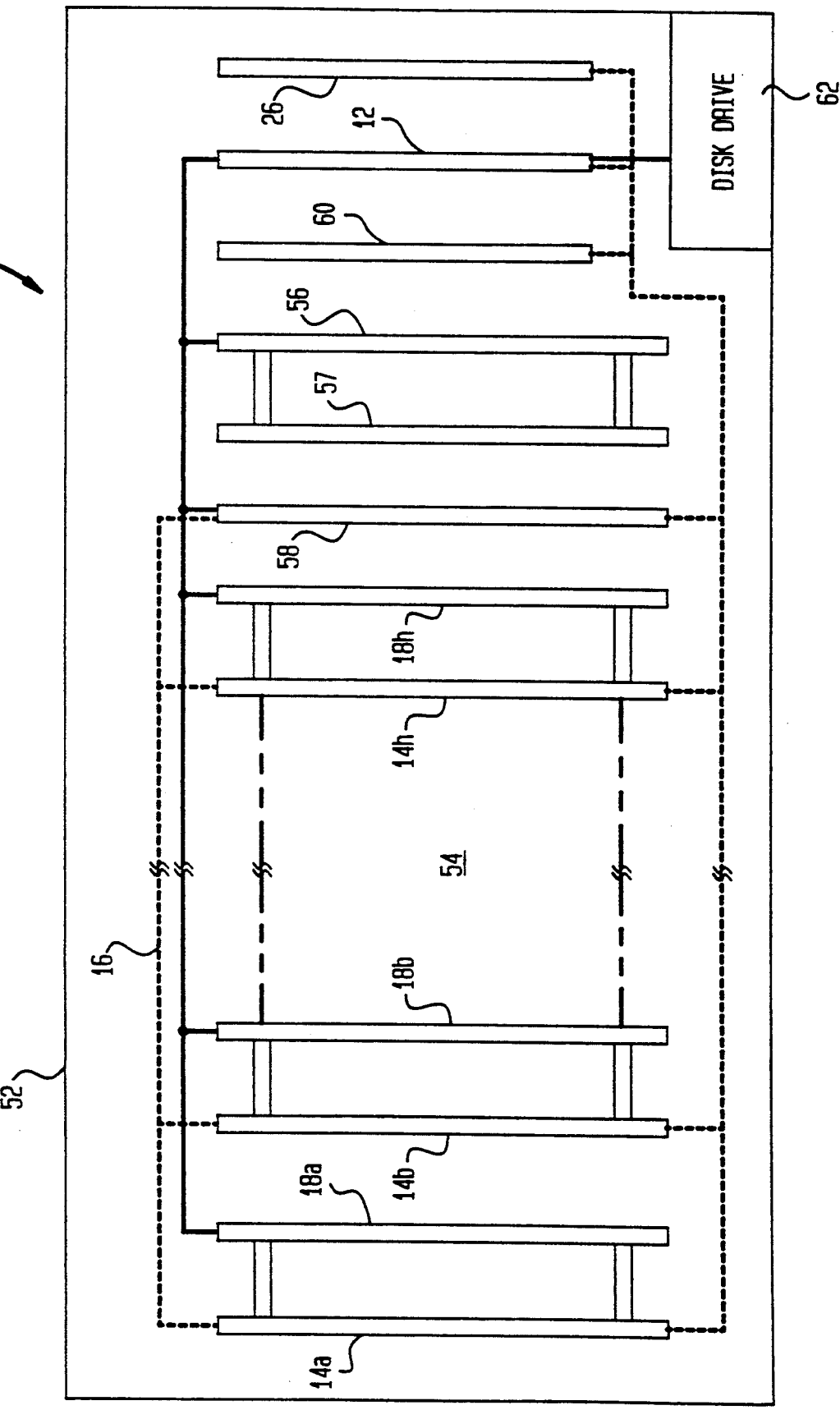
FIG. 2 is a plan view of the system shown in FIG. 1.

With reference to FIG. 2, the lay out the system 10 of the digital voice processing system 10 is shown in plan view. The system 10 includes a housing 52 having a base 54 to which the voice processing boards 14 and audio cards 18 are physically attached in pairs without necessarily being logically connected so that the cards can be logically intermixed with one another. More specifically, and by way of example, the voice processing card 14b can be physically connected to audio card 18b but logically connected to audio card 18a. In FIG. 2 the system 10 is shown having eight pairs of voice processing cards 14a-14b and audio cards 18a-18h but some of the voice processing cards can be replaced with dummy cards that only provide physical support and electrical connections to the audio cards without logic. Also included is a sixteen port audio card 56, a clock buffer 58, a local area network (LAN) card 60, the host computer 12, a disk drive 62 and the disk storage 26. A bus 44 connects the host computer 12 to the audio cards 18, 56 and clock buffer 58 so as to control access of the audio processor to locations of RAMs within the TDM chip 46. The host computer 12 can be attached optionally to a PC supervisor 64, see FIG. 1, that would provide a keyboard and monitor that would be beneficial when the system 10 is expanded and would also allow a supervisor to communicate with any memory location in the system 10 and duplicate the same on a different location so that conference calls could take place. Other functions could be performed through the PC supervisor such as diagnostics. The voice processing cards 14 have the capacity to serve a number of audio cards 18 and also serve a 16 port audio card.

By way of example one operation will be described, but it will be appreciated that the system 10 is capable of a variety of functions as indicated in the disclosure. A phone message will be transmitted from a telephone 22, and a signal will be received by the analogue interface 50 of one of the audio cards 18a, 18b-18n. Although only the operations of one telephone 22 and one audio card 22 will be described, it will be appreciated that any one of the telephones 22a, 22b ... 22n or and any one of the audio cards 18a, 18b ... 18n could be involved and would function in the same manner. The analogue interface 50 is a loop start type of interface and handles all telephone communications on a first come, first call basis. The analogue interface 50 transforms incoming analogue signals to digital signals, balances the impedance of the telephone 20 system to that of the system 10, and optimizes signal integrity. A digital signal will be sent to the audio processor 48 which is a fast acting signal processing chip. A signal will be sent through the TDM chip 46, onto the TDM bus 16 and will be subsequently received by the TDM chip 44 and a signal processor 36. The signal processor 36a will receive the signal that a telephone 22 is requesting service from an audio process 48. The signal will be sent to an application processor 38a. The response to the request for service will be controlled by the application processor 38a which will direct the signal processor 36a to signal the audio processor to go off hook.

After the audio processor 48 is told to go off hook, communication is established with the telephone user and prompts would give instructions thereto. The user would then respond to the prompts by sending DMTF signals to the system 10 through use of the telephone keyboard.

Data is then received by a signal processor 36 where processing such as speech compression and expansion, call programming, automatic gain control, dual tone multi-frequency extraction, and voice activated operations takes place. The application processor 38 performs high level application such as dictation, transcription, voice mail, voice response, medical records, and the like. Each application processor 38a, 38b can run any of the different types of application processing and can run two applications of the same type simultaneously.

The data is then forwarded from the application processor 38 over the bus 32 to the bus interface 30 by way of the PCI chip 40a 40b and it is subsequently forwarded to the processor 24 informing it of the transaction so that the processor can control data traffic. Voice data is stored in a RAM 42a until the RAM's capacity is exceeded after which the data will be transmitted to the disk storage 26 for subsequent retrieval. The host processor 24 acts as a manager for voice data going into the disk storage 26 and will control specific operations of the system 10 such as systems diagnostics, voice file management and memory location assignments.

Thus what has been shown and described is a modular digital voice processing system wherein components, software, and applications can be readily changed without the need of replacing hardware.

What is claimed is:

1. A digital modular voice processing system comprising:
   a) a host computer having a host processor, and a storage medium, a memory and a bus interface in communication with said host processor,
   b) a first bus in communication with said bus interface,
   c) a voice processing card having at least one digital signal processor and at least one application processor in communication with said at least one digital signal processor, a first interface providing communication between said at least one application processor and said first bus, and a first time division multiplexer chip in communication with said at least one digital signal processor,
   d) a second bus in communication with said first time division multiplexer chip, and e) at least one audio card including a second time division multiplexer chip that communicates with said second bus, an audio processor in communication with said second time division multiplexer chip, and a second interface in communication with said audio processor, said second interface having a plurality of ports that provide communication with communication lines.

2. The system of claim 1 wherein said voice processing card includes two application processors, two first interfaces each in communication with an application processor on a one to one basis and two pairs of digital signal processors each pair in communication with one of said application processors on a one to one basis, each of said voice processors being in communication with said first time division multiplexer chip.

3. The system of claim 2 wherein said storage medium is a storage disk.

4. The system of claim 1 wherein said second interface of said audio card has means for converting analogue signals received from said ports to digital signals and converting digital data received data received from said audio processor to analog signals.

5. The system of claim 4 wherein said signal processor has means for performing voice compression and expansion, automatic gain control, dual tone multi-frequency extraction and voice activated operations.

6. The system of claim 5 wherein said application processor includes means for performing dictation, transcription, voice mail, voice response and medical records.

7. The system of claim 1 including a housing, said host computer, said first bus, said at least one voice processing card, said second bus, and said at least one audio card being supported by said housing and said at least one voice processing card and said at least one audio card are physically and electrically connected, and said host computer is logically connected to said voice processing card and to said at least one audio card.

8. A digital modular voice processing system comprising:
   a) an interface for receiving analogue voice signals from a telephone line and converting said analogue voice signals to digital voice data,
   b) an audio processor in communication with interface,
   c) first time division multiplexing means in communication with said audio processor for receiving and multiplexing said digital voice data and acting as temporary storage for data,
   d) a bus in communication with said first time division multiplexing means for receiving digital voice data therefrom,
   e) second time division multiplexing means in communication with said bus for multiplexing digital voice data received from said bus,
   f) voice data processing means in communication with said second time division multiplexing means for receiving multiplexed digital voice data and performing digital processing operations on the multiplexed digital voice data,
   g) application processing means in communication with said voice data processing means for performing application processing on the processed digital voice data received from said voice data processing means, and
   h) a host computer in communication with said application processing means for receiving and storing application processed digital voice data.

9. The system of claim 8 wherein said host computer is in logical communication with said audio processor.

10. The system of claim 8 wherein said voice data processing means performs voice compression and expansion; automatic gain control, extracts dual tone multi-frequency extraction and voice activated operations.

* * * * *